United States Patent
Couper et al.

(10) Patent No.: US 10,992,384 B1
(45) Date of Patent: Apr. 27, 2021

(54) SINGLE-PHOTON AVALANCHE DIODE-BASED LIGHT COMMUNICATION DEVICES

(71) Applicant: STMicroelectronics (Research & Development) Limited, Marlow (GB)

(72) Inventors: Ellen Couper, Edinburgh (GB); Neale Dutton, Edinburgh (GB); Alexios Alexandropoulos, Edinburgh (GB)

(73) Assignee: STMICROELECTRONICS (RESEARCH & DEVELOPMENT) LIMITED, Marlow (GB)

( * ) Notice: Subject to any disclaimer, the term of this patent is extended or adjusted under 35 U.S.C. 154(b) by 0 days.

(21) Appl. No.: 16/730,036

(22) Filed: Dec. 30, 2019

(30) Foreign Application Priority Data

Oct. 25, 2019 (GR) .................. GR20190100475

(51) Int. Cl.
| | | |
|---|---|---|
| H04B 10/00 | (2013.01) | |
| H04B 10/116 | (2013.01) | |
| H04B 10/66 | (2013.01) | |
| H04B 10/50 | (2013.01) | |
| H04B 10/70 | (2013.01) | |

(52) U.S. Cl.
CPC ......... H04B 10/116 (2013.01); H04B 10/503 (2013.01); H04B 10/66 (2013.01); H04B 10/70 (2013.01)

(58) Field of Classification Search
CPC .... H04B 10/116; H04B 10/503; H04B 10/66; H04B 10/70
USPC .......................................................... 398/118
See application file for complete search history.

(56) References Cited

U.S. PATENT DOCUMENTS

| | | | | |
|---|---|---|---|---|
| 2013/0188967 | A1* | 7/2013 | Eiselt | H04L 25/4906 398/140 |
| 2015/0123611 | A1 | 5/2015 | Huang | |
| 2018/0123611 | A1* | 5/2018 | Dutton | G01S 7/4863 |
| 2018/0359031 | A1 | 12/2018 | Raynor et al. | |

OTHER PUBLICATIONS

Cailean, Alin-Mihai, et al., "Digital Signal Processing Sensor for Automotive Visible Light Communications Applications", 2017 New Generation of CAS (NGCAS), Sep. 2017, 4 pages.

Chang, Fu-Liang, et al., "Design and implementation of anti low-frequency noise in visible light communications", Proceedings of the 2017 IEEE International Conference on Applied System Innovation, IEEE-ICASI, May 2017, 3 pages.

* cited by examiner

*Primary Examiner* — Mohammad R Sedighian
(74) *Attorney, Agent, or Firm* — Slater Matsil, LLP

(57) ABSTRACT

A method of processing a visible light communication (VLC) signal using a single-photon avalanche diode (SPAD) includes detecting photons of a VLC signal at a SPAD detector, counting the photons detected by the SPAD detector to generate a combined VLC signal comprising a data signal and an ambient signal, extracting the ambient signal from the combined VLC signal, subtracting the ambient signal from the combined VLC signal to generate the data signal, and outputting the data signal as a bitstream.

20 Claims, 8 Drawing Sheets

SINGLE-PHOTON AVALANCHE DIODE-BASED LIGHT COMMUNICATION DEVICES

This application claims priority to Greek Application No. 20190100475, filed on Oct. 25, 2019 which application is hereby incorporated herein by reference in its entirety.

TECHNICAL FIELD

The present invention relates generally to light communication systems, and, in particular embodiments, to light communication systems and devices that include a single-photon avalanche diode, and methods of operation thereof.

BACKGROUND

Visible light communication (VLC) is an emerging and expanding technology which may be motivated by energy efficiency in comparison to radio frequency communication and a present status of being unrestricted by regulations. VLC technology may utilize light with wavelengths not only in the region of the electromagnetic spectrum visible to human eyes, but also in the infrared and ultraviolet regions as well. VLC may allow for ubiquitous communication between many devices and can potentially make use of existing light infrastructures. VLC also utilizes direct line-of-sight between the transmitter/receiver of interacting devices which may make it a safer candidate for use in applications where security is a priority such as secure payment methods. Direct line-of-sight communication such as VLC also finds potential application in safer Wi-Fi for planes, hospitals, and other environments where interference might jeopardize crucial functions.

As applications for VLC devices become more widespread VLC devices that are small and energy efficient become more and more desirable. Additionally, as VLC technology is used in more varied applications, the number of different types of ambient environments within which VLC devices are expected to operate increases. However, conventional VLC systems include analog circuit implementations that can be bulky and inefficient. Therefore, an efficient VLC system with a smaller footprint and compensation for ambient noise may be desirable.

SUMMARY

In accordance with an embodiment of the invention, a method of processing a VLC signal using a single-photon avalanche diode (SPAD) includes detecting photons of a VLC signal at a SPAD detector, counting the photons detected by the SPAD detector to generate a combined VLC signal comprising a data signal and an ambient signal, extracting the ambient signal from the combined VLC signal, subtracting the ambient signal from the combined VLC signal to generate the data signal, and outputting the data signal as a bitstream.

In accordance with another embodiment of the invention, a VLC receiver includes a single-photon avalanche diode (SPAD) array configured to detect photons of a VLC signal, a plurality of photon counters electrically coupled to corresponding SPADs of the SPAD array and configured to count the photons detected by the SPAD array to generate a combined VLC signal comprising a data signal and an ambient signal, an ambient extraction circuit electrically coupled to the plurality of photon counters and configured to extract the ambient signal from the combined VLC signal, and a data extraction circuit electrically coupled to the plurality of photon counters and the ambient extraction circuit. The data extraction circuit is configured to subtract the ambient signal from the combined VLC signal to generate the data signal. The VLC receiver further includes an output circuit electrically coupled to the data extraction circuit and configured to output the data signal as a bitstream.

In accordance with still another embodiment of the invention, a VLC system includes a VLC transmitter and a VLC receiver. The VLC transmitter includes an encoder configured to encode a data signal to generate an encoded signal and a photon emitter configured to transmit the encoded signal as a VLC signal. The VLC receiver includes a single-photon avalanche diode (SPAD) array configured to detect photons of the VLC signal and generate a photon count signal, a digital signal processing circuit electrically coupled to the SPAD array and configured to determine the encoded signal from the photon count signal, and a decoder electrically coupled to the digital signal processing circuit and configured to decode the encoded signal to generate the data signal.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale. The edges of features drawn in the figures do not necessarily indicate the termination of the extent of the feature.

DETAILED DESCRIPTION OF ILLUSTRATIVE EMBODIMENTS

Figure 1:
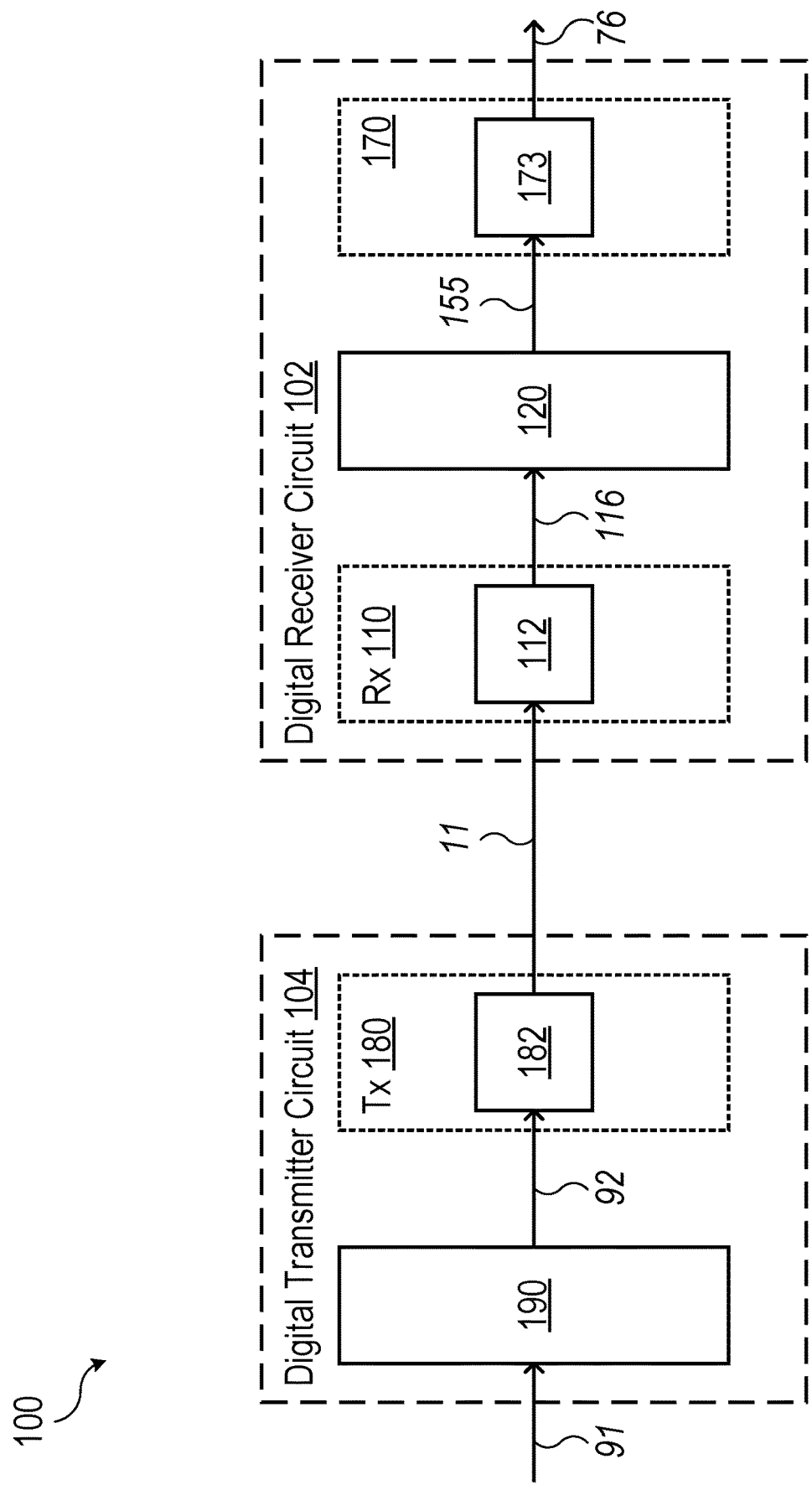
FIG. 1 illustrates a schematic block diagram of an example visible light communication system in accordance with an embodiment of the invention.

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

It should be noted that visible light communication (VLC) as described herein is intended to generally to refer to light-modulated communication in which data signals transmitted by digitally modulating electromagnetic radiation. Consequently, VLC may utilize light with wavelengths not only in the region of the electromagnetic spectrum visible to human eyes, but also to the infrared (IR) and ultraviolet (UV) regions as well other wavelengths. Specifically, it is conceivable that the systems, devices, and methods described herein could be used with any wavelength of light inasmuch as the photon source could be sufficiently digitally modulated. Therefore, in some cases, VLC as described herein may also encompass optical wireless communication (OWC), light fidelity (Li-Fi) communication, and the like.

Conventional VLC systems use photodetectors or photodiodes as light sensors to detect a VLC signal and require bulky, inefficient analog circuit implementations. For example, conventional VLC systems utilize analog-to-digital converters, automatic gain control, and transimpedance amplifiers, all of which increase the size of the VLC system and use large amounts of system resources. Further, conventional VLC systems use multiple filter stages to account for ambient noise in contrast to digital processing methods which may directly detect and subtract background noise. Conventional VLC systems that use fully analog circuitry are optimized for particular light conditions and frequencies reducing flexibility of the system.

Single-photon avalanche diode (SPAD) detectors may be a potentially advantageous option for photon detectors in VLC systems since a SPAD can detect single photons and has a high speed digital output. For example, using a photon detector that generates a native digital output signal may advantageously facilitate the design of a completely digital VLC receiver.

In various embodiments, a VLC system includes a digital VLC receiver circuit that includes a SPAD detector configured to detect photons of a VLC signal. The digital VLC receiver circuit further includes a digital signal processing circuit configured to extract a data signal from the VLC signal and output the data as a bitstream.

Advantageously, the VLC system may be a fully digital implementation. The all-digital implementation may advantageously reduce the space requirement for the VLC system compared to conventional VLC systems. Another possible benefit of an all-digital implementation is increased energy efficient. The VLC system may also have the advantage of being more adaptable to different frequencies and light conditions. Embodiment VLC systems may also be advantageously integrated into time-of-flight (ToF) devices to improve existing functionality and expand possible applications.

In various embodiments, the digital signal processing circuit may include a data extraction circuit and an ambient extraction circuit configured to simultaneously and continuously separate a data signal and an ambient signal from the VLC signal. The ambient signal may advantageously be subtracted from the VLC signal to generate the data signal. A possible advantage of the data extraction circuit and the ambient extraction circuit is that the ambient signal can be measured continuously rather than separately defining temporally separate signal measurement and ambient measurement periods.

Signal levels may be tracked in the VLC system to advantageously enable dynamic threshold adjustment. Tracked signal levels may also beneficially enable reporting when signal levels make data retrieval too unreliable (e.g. ambient signal level is too high compared to data signal level). The flicker rate (frequency of ambient light) may also be beneficially tracked. Possible advantages of tracking the flicker rate may include improved ambient noise compensation as well as improved functionality of other devices included in the VLC system such as imaging devices.

Conventional VLC systems that rely on analog implementations use large-area components such as phase-locked loop (PLL) circuits that are complex and inefficient due to being high power. Embodiment VLC systems may include clock recovery functionality using a data rate detection circuit which may advantageously perform energy efficient clock recovery digitally while preserving valuable real estate.

Embodiments provided below describe various structures and methods of operating light communication systems, and in particular, light communication systems that include a single-photon avalanche diode. The following description describes the embodiments. An embodiment VLC system is described using a schematic circuit block diagram using FIG. 1. An embodiment digital VLC receiver circuit is described using FIG. 2. Several example graphs of signals generated by embodiment digital VLC receiver circuits are described using FIGS. 3-5. An embodiment infinite impulse response filter is described using FIG. 6. Various signals generated by embodiment VLC devices are described using FIGS. 7A and 7B. An embodiment method of processing a VLC signal is described using FIG. 8.

FIG. 1 illustrates a schematic block diagram of an example VLC system in accordance with an embodiment of the invention. Reference is made to circuits in the following. A circuit may refer to any collection of circuit elements and may also be referred to as a circuit block, a block, a module, an electronic device, and the like. Any connections between circuits may represent a single connection or multiple connections.

Referring to FIG. 1, a VLC system 100 includes a digital VLC receiver circuit 102 and a digital VLC transmitter circuit 104. The digital VLC transmitter circuit 104 transmits a VLC signal 11 that the digital VLC receiver circuit 102 detects and processes. The digital VLC transmitter circuit 104 may transmit the VLC signal 11 by encoding an input data signal 91 using an encoder 190 to generate an encoded signal 92 that is transmitted by a transmitter 180 as the VLC signal 11. Alternatively, a raw binary data signal may also be transmitted as a VLC signal by the digital VLC transmitter circuit 104. The VLC signal 11 is transmitted by a photon emitter 182 of the transmitter 180. Modulation of the VLC signal 11 in the VLC system 100 is digital modulation in various embodiments. Digital modulation usable in VLC may include any suitable modulation technique such as amplitude-shift keying (ASK), phase-shift keying (PSK), frequency-shift keying (FSK), and others. For example, VLC signals may be transmitted by rapidly switching a light emitting diode (LED) on and off. In some embodiments, the VLC signal 11 may utilize ASK modulation and utilizes on-off keying (OOK) modulation in one embodiment.

A receiver 110 of the digital VLC receiver circuit 102 detects the VLC signal 11 using a photon detector 112 and generates a photon count signal 116. The photon count signal 116 is provided to a digital signal processing circuit 120 (e.g. a digital signal processor or DSP). The photon count signal 116 includes the input data signal 91 as a data component and may also include any ambient component detected by the photon detector 112. The digital signal processing circuit 120 processes the photon count signal 116 to generate a processed data signal 155. The processed data signal 155 includes the same data as the input data signal 91 and has the same encoding as the encoded signal 92.

The processed data signal 155 is sent to an output circuit 170. The output circuit 170 may include a decoder 173 as shown. The decoder 173 may decode or transcode the processed data signal 155 to generate an output data signal 76 that includes the same data as the input data signal 91. Alternatively, the decoder 173 may be omitted or bypassed if the processed data signal 155 is transmitted in an appropriate form for output by the digital VLC receiver circuit 102 such as a raw binary data signal, for example.

The receiver 110 detects photons of the VLC signal 11 using the photon detector 112 and generates a photon count signal 116 as a digital electrical signal. The receiver 110 may also be referred as a VLC receiver, a digital VLC receiver, Rx and the like. In various embodiments, the photon detector 112 includes at least one single-photon avalanche diode (SPAD) configured as a SPAD detector. In one embodiment, the SPAD detector is arranged as a SPAD array. Utilizing a SPAD detector as the photon detector 112 may advantageously facilitate generation of a digital signal directly from the detector. For example, the VLC signal 11 is an analog signal that is transmitted across free space that is detected by the photon detector 112. A SPAD detector can advantageously count the number of photons detected per time interval and generate a digital electrical signal comprising discrete photon count values that corresponds to the detected VLC signal 11.

The photon count signal 116 is a digital signal corresponding to the number of photons detected at the photon detector 112 in a given time interval. The photon count signal 116 includes the photons of the VLC signal 11 as well as any coincidental photons hitting the photon detector 112. Such coincidental photons may be considered ambient noise. The photons of the VLC signal 11 are responsible for the data component of the photon count signal 116 while the ambient noise is responsible for the ambient component of the photon count signal 116. The photon count signal 116 may also be referred to as a combined VLC signal due to the inclusion of both the data component and the ambient component in the photon count signal 116.

The digital signal processing circuit 120 receives the photon count signal 116 and generates the processed data signal 155. In one embodiment, the digital signal processing circuit 120 is implemented as a digital signal processor (DSP). Various signal processing may be performed by the digital signal processing circuit 120, the specifics of which may depend on desirable functionality of a particular application. In one embodiment, the digital signal processing circuit 120 is configured to continuously extract the ambient component of the photon count signal 116 as an ambient signal and subtract the ambient signal from the photon count signal 116 to generate the processed data signal 155. Other signal processing may also be performed by the digital signal processing circuit 120 such as signal filtering, clock recovery, signal level tracking, mathematical operations, threshold adjustment, demodulation, and others.

The processed data signal 155 is substantially similar or identical to the encoded signal 92. For example, the processed data signal 155 may be a demodulated data signal 155 corresponding to the encoded signal 92. In some embodiments, the processed data signal 155 is an encoded bitstream. The output data signal 76 includes substantially similar data as the input data signal 91 and may be substantially similar or identical to the input data signal 91. For example, the output data signal 76 may be an output bitstream.

The VLC signal 11 includes photons in the visible or near visible range of the electromagnetic spectrum. For example, the VLC signal 11 may include light in the infrared portion of the electromagnetic spectrum. In various embodiments the VLC signal 11 includes light in the near infrared (NIR) range (e.g. about 750 nm to about 1400 nm) of the electromagnetic spectrum and includes light with a wavelength of between 825 nm and 950 nm in some embodiments. In one embodiment, the wavelength of the photons in the VLC signal 11 is about 940 nm. In other embodiments, the wavelength of the photons in the VLC signal 11 is about 850 nm, about 840 nm, and others. However, other regions of the electromagnetic spectrum may also be utilized for the VLC signal 11. For example, the photons of the VLC signal 11 may also be in the visible spectrum (e.g. about 375 nm to about 780 nm), ultraviolet (e.g. the near ultraviolet from about 300 nm to about 400 nm), and others.

The transmitter 180 generates the photons of the VLC signal 11 using the photon detector 112. The transmitter 180 may also be referred to as a VLC transmitter, a digital VLC transmitter, Tx, and the like. The photon emitter 182 may be any suitable photon source. In various embodiments, the photon emitter 182 is a laser. In some embodiments, the photon emitter 182 includes a vertical-cavity surface-emitting laser (VCSEL) and is a VCSEL array in one embodiment. In other embodiments, the photon emitter 182 may be another suitable light source such as a light emitting diode (LED).

Although shown as separate devices for the purpose of describing functionality, the digital VLC receiver circuit 102 and a digital VLC transmitter circuit 104 may also be included in a single VLC transceiver device configured to receive data by detecting and processing VLC signals sent by external VLC devices and to send data by transmitting VLC signals to external VLC devices.

The VLC system 100 may advantageously be an all-digital VLC system. For example, the VLC system 100 may not require one or more of a signal amplifier, an analog-to-digital converter, automatic gain control, and multiple filter stages to adaptively filter out noise. Further possible advantages of the VLC system 100 may be increased efficiency and decreased size due to omitting various analog circuit elements.

Since the communication in the VLC system 100 is asynchronous, timing of incoming data may need to be determined. A possible method of determining the timing (e.g. data rate) of incoming data may be to measure the length of an individual bit. Such a bit width may be determined by a 010 bit pattern or a 101 bit pattern in the data signal. However, ordinary data may have relatively long time periods without such bit patterns. Therefore, encoding schemes (e.g. line codes) which map binary data (i.e. 8 bit bytes of data) to characters longer than 8 bits in length can be used to eliminate long strings of 0's and 1's in transmitted data.

Mapping (i.e. encoding) 8 bit bytes to larger characters results in a difference between the number of bits going into the encoder and the number of bits coming out. In order to prevent a bottleneck, the data rate of the data going into the encoder is less than the data rate coming out. For example, if an encoding scheme as described above is used for the VLC system 100, the data rate of the input data signal 91 is less than the data rate of the encoded signal 92 which is equal to the data rate of the VLC signal 11. Similarly, the data rate of the photon count signal 116 is equal to the data rate of the VLC signal 11 and the same as the data rate of the processed data signal 155. As with the input data signal 91, the output data signal 76 is less than the data rate of the VLC signal 11 since the decoder 173 transcodes the processed data signal 155 back to an 8 bit per byte bitstream. It should be noted that there is no requirement that the output bitstream be the original coding. However, it may be desirable for the output data signal 76 to be in the original efficient form for many practical applications such as computing.

Figure 2:
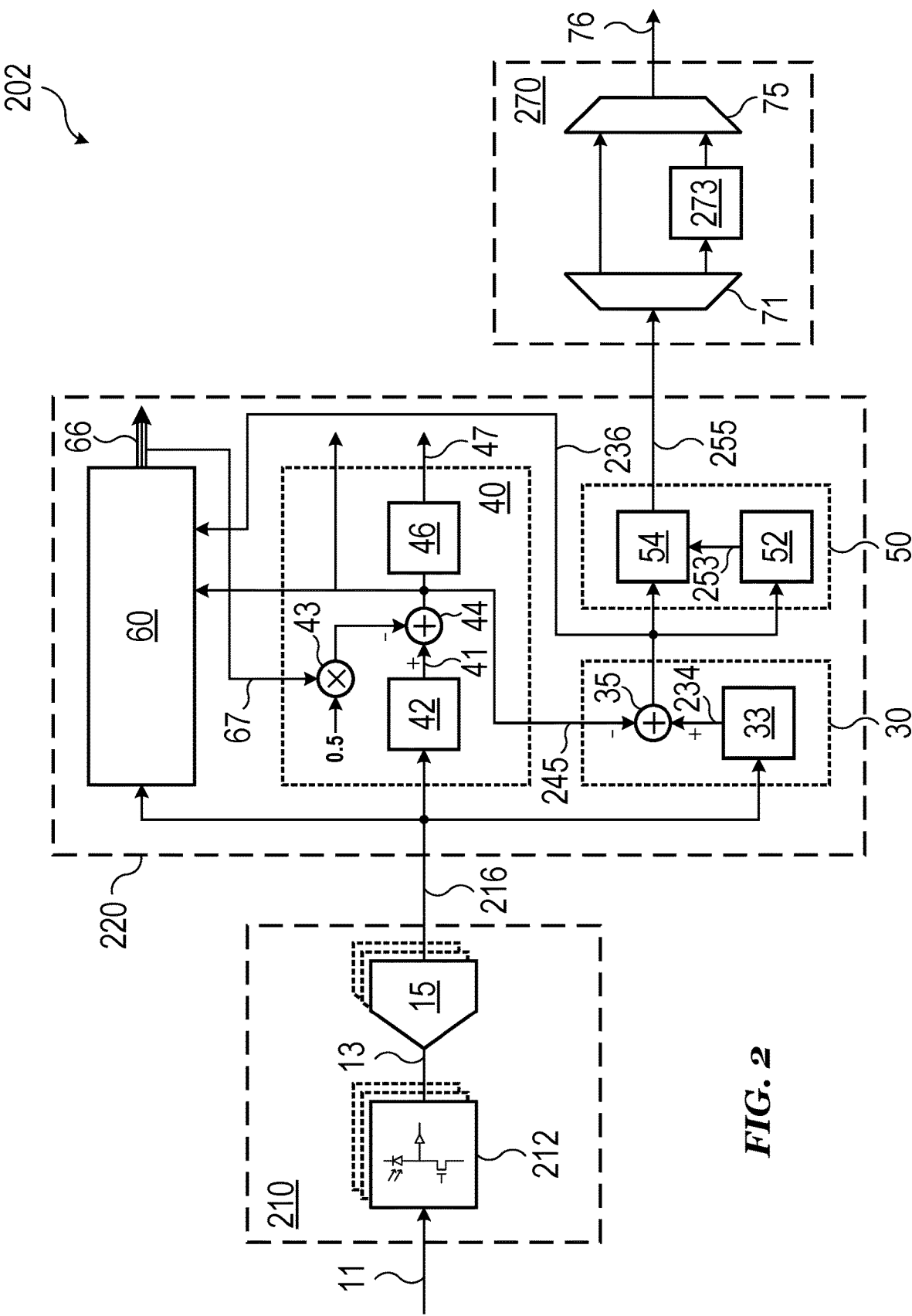
FIG. 2 illustrates a schematic block diagram of an example digital visible light communication receiver circuit including a single-photon avalanche diode detector in accordance with an embodiment of the invention.

FIG. 2 illustrates a schematic block diagram of an example digital VLC receiver circuit including a single-photon avalanche diode detector in accordance with an embodiment of the invention. The digital VLC receiver circuit of FIG. 2 may be a specific implementation of other digital VLC communication circuits described herein, such as the digital VLC receiver circuit 102 of FIG. 1, for example. Similarly labeled elements may be as previously described.

Referring to FIG. 2, a digital VLC receiver circuit 202 includes a receiver 210 electrically coupled to a digital signal processing circuit 220 that is in turn electrically coupled to an output circuit 270. The receiver 210 includes a SPAD detector 212 which may be a specific implementation of a photon detector as previously described. The SPAD detector 212 is a one or two dimensional array of the SPAD detector 212 is configured to detect a VLC signal 11 and generate a photon detection signal 13. The photon detection signal 13 is received by a photon counter 15. In some embodiments, the SPAD detector 212 is a SPAD array. For example, the SPAD detector may be a one-dimensional, two-dimensional, or three dimensional SPAD array. Similarly, the photon counter 15 is a plurality of photon counters in one embodiment. In this case, the relationship between SPADs of the SPAD detector and the plurality of photon counters may be 1:1.

The SPAD detector 212 may advantageously be configured to operate in Geiger-mode in order to generate a rapidly quenched avalanche current corresponding to an incident photon of the VLC signal 11 that can be easily counted at the photon counter 15. In the case of SPAD arrays, the photon detection signal from each SPAD can be combined to generate a digital signal output as a photon count signal 216. The photon count signal 216 includes discrete photon count values delivered to the digital signal processing circuit 220 at regular intervals (e.g. on the order of 100 ns). As previously described, the photon count signal 216 includes both a data component from the VLC signal 11 and an ambient component from ambient noise detected by the SPAD detector 212.

Still referring to FIG. 2, the digital signal processing circuit 220 includes a data extraction circuit 30, an ambient extraction circuit 40, a demodulator 50, and a signal tracking circuit 60. The photon count signal 216 is simultaneously received by each of the data extraction circuit 30, the ambient extraction circuit 40, and the signal tracking circuit 60. The signal tracking circuit 60 tracks and outputs various signal levels 66 within the digital signal processing circuit 220. One or more of these circuits may be omitted depending on desired functionality of a particular application.

The ambient extraction circuit 40 includes an infinite impulse response (IIR) filter 242 which is used to extract a low frequency signal 41 from the photon count signal 216. In one embodiment, the IIR filter 242 is an IIR periodic reset filter. For example, the data component of the photon count signal may have a frequency of about 10 MHz while the ambient component has a frequency between about 100 Hz and about 2 kHz. The IIR filter 242 may be used to filter out frequencies above a certain ambient threshold frequency (e.g. 2 kHz) in order to generate the low frequency signal 41.

A data level offset is calculated by a data level multiplier stage that receives the data signal level 67 from the signal tracking circuit 60. For example, the data level multiplier stage may multiply the data signal level 67 by 0.5 before sending the result to a data level subtraction stage 44. The low frequency signal 41 is provided to the data level subtraction stage 44 that subtracts out the data level offset from the low frequency signal 41 to generate an ambient signal 245 corresponding to the ambient component of the photon count signal 216.

The ambient signal 245 is sent to the data extraction circuit 30 to facilitate correction of the data signal for ambient noise, and the signal tracking circuit 60 so that the ambient signal level can be tracked. The ambient signal 245 may also be sent to an ambient rate detection circuit 46 of the ambient extraction circuit 40 and/or be provided as an output of the ambient extraction circuit 40 as shown. The ambient rate detection circuit 46 may be omitted in certain applications.

The ambient rate detection circuit 46 detects and outputs the ambient frequency 47 of the ambient signal 245. The ambient frequency 47 may also be referred to as the flicker rate. Real-time monitoring of the flicker rate of an environment may beneficially allow the digital VLC receiver circuit 202 and other circuits of a VLC device in which the digital VLC receiver device is incorporated to effectively adapt to periodic ambient noise. For example, if the ambient noise is very high in comparison to the intensity of the VLC signal 11 then transmissions can be made in between peaks of the ambient noise so that the VLC signal 11 could still be resolved at a slower rate.

The data extraction circuit 30 may include a smoothing filter 33 that receives the photon count signal 216. The smoothing filter 33 may be used to smooth the photon count signal 216 (e.g. remove shot noise) to generate a smoothed signal 234. Shot noise may result in large variance between adjacent points at a same data level which can lead to errors in determining the data level of the signal. The smoothing filter 33 may smooth the signal to reduce the likelihood of misattributing a data level during signal processing. In one embodiment, the smoothing filter 33 is a bilateral filter (BLF). BLFs perform a smoothing function (e.g. averaging) between proximal points of similar amplitude while excluding points that are too far away and/or of sufficiently dissimilar amplitude. When the smoothing filter 33 is implemented as a BLF, a possible advantage may be preservation of sharp data edges while maintaining shot noise reduction. Alternatively, the smoothing filter 33 may also be a different type of filter such as a moving average filter, for example.

The smoothed signal 234 (or the photon count signal 216 if the smoothing filter 33 is omitted) is received at an ambient subtraction stage 35. The ambient subtraction stage 35 also receives the ambient signal 245 that was provided to the data extraction circuit 30 from the ambient extraction circuit 40. The ambient signal 245 is subtracted from the smoothed signal 234 at the ambient subtraction stage 35 to generate a data signal 236. Specifically, the data signal 236 includes discrete photon count values that correspond only to the data component of the photon count signal 216. The data signal 236 is sent to the demodulator 50 and to the signal tracking circuit 60.

After leaving the data extraction circuit 30, the data signal 236 is a representation of the data contained in the VLC signal 11 received by the receiver 210. However, as mentioned above, the data is represented by photon count values that are sampled at a higher frequency than the data rate (i.e. bits per second) of the data signal 236. The demodulator 50 receives the data signal 236 and outputs a bit at the data rate of the data signal 236. In various embodiments, the communication is asynchronous and a method of clock recovery is used to determine when the demodulator 50 will record a bit.

As illustrated, the demodulator 50 may include a data rate detection circuit 52 and a comparator 54. Both the data rate detection circuit 52 and the comparator 54 receive the data signal 236. The data rate detection circuit 52 detects a data rate of the data signal 236. For example, the data rate detection circuit 52 may be configured to detect transitions between logic levels and count the number of photon counts between each transition. An upper threshold may be defined so as to allow exclusion of strings of photon counts that are too long (e.g. represent streams of identical bits). The sampling rate of the photon counts is a known quantity and may be used in conjunction with the number of photon counts that the data rate detection circuit 52 detections between transitions for a single bit (e.g. 010 or 101 as mentioned previously) to calculate the data rate.

Using the current data rate, the data rate detection circuit 52 may send a data rate signal 253 to trigger the comparator 54 to output either a '1' or a '0' as part of a demodulated data signal 255. For example, the comparator 54 may compare the instantaneous values of the data signal 236 and the data rate signal 253 and output a low logic bit when the data rate signal 253 is high and the data signal 236 is below a threshold and output a high logic bit when the data rate signal 253 is high and the data signal 236 is above the threshold. The data rate signal 253 may also be a value indicating the number of data points that should separate outputs from the comparator 45. For example, the data rate signal 253 may be 10 indicating to the comparator 54 that a bit should be output every 10 data points. Alternatively, other methods of demodulating the data signal 236 may also be used. For example, the system may receive a clock signal or alignment structures may be included in the VLC signal 11.

The demodulated data signal 255 is sent to the output circuit 270. The output circuit 270 includes a decoder 273 and may include a demultiplexer 71 and a multiplexer 75 configured to allow the decoder 273 to be bypassed. For example, the demultiplexer 71 and the multiplexer 75 may receive a selector signal to choose between a mode in which the modulated data signal 255 is decoded and a mode in which the decoder 273 is bypassed. The decoder 273 may decode the demodulated data signal 255 to generate an output data signal 76 of bits that are equivalent to the data included in the VLC signal 11.

In one embodiment, the decoder 273 is an 8b/10b decoder. As previously discussed, the data rate of the VLC signal 11 may be higher than the data rate of output data signal 76. For example, the data rate of the VLC signal 11 may be higher because the VLC signal 11 is encoded to ensure that sufficient 010 and 101 bit patterns exist in the data signal 236 in order to facilitate clock recovery. 8b/10b encoding may advantageously provide a bounded run-length equal to five consecutive identical bits. 8b/10b encoding may also advantageously facilitate neutral disparity using paired disparity (i.e. non-neutral characters come in pairs that are appropriately chosen during encoding such that the running disparity always moves toward zero).

As discussed above, the data rate of the output data signal 76 may be 75% of the data rate of the data signal 236 (e.g. when 8b/10b encoding is used). The difference between the data rates may also be higher or lower depending on the specific implementation. As previously mentioned if no encoding is used or encoding that does not change the size of a word is used, the data rates can also be the same. In one embodiment, the data rate of the output data signal 76 is 8 Mb/s and the data rate of the data signal 236 is 10 Mb/s. In another embodiment, the data rate of the output data signal 76 is 10 Mb/s and the data rate of the data signal 236 is 12.5 Mb/s. In the latter case, the effective data rate is 10 Mb/s because the bitstream out of the output circuit 270 has a data rate of 10 Mb/s. The data rates may also be higher or lower depending of the specific application.

Any of the analogous components of the VLC system 100 of FIG. 1 may be implemented in a manner similar to one or more of the components as described with respect to FIG. 2. For example, the receiver 110 of FIG. 1 may include a SPAD detector and/or a photon counter as described in reference to FIG. 2. Similarly, the digital signal processing circuit 120 and the output circuit 170 of FIG. 1 may include some or all of the components as described in reference to FIG. 2.

Figure 3:
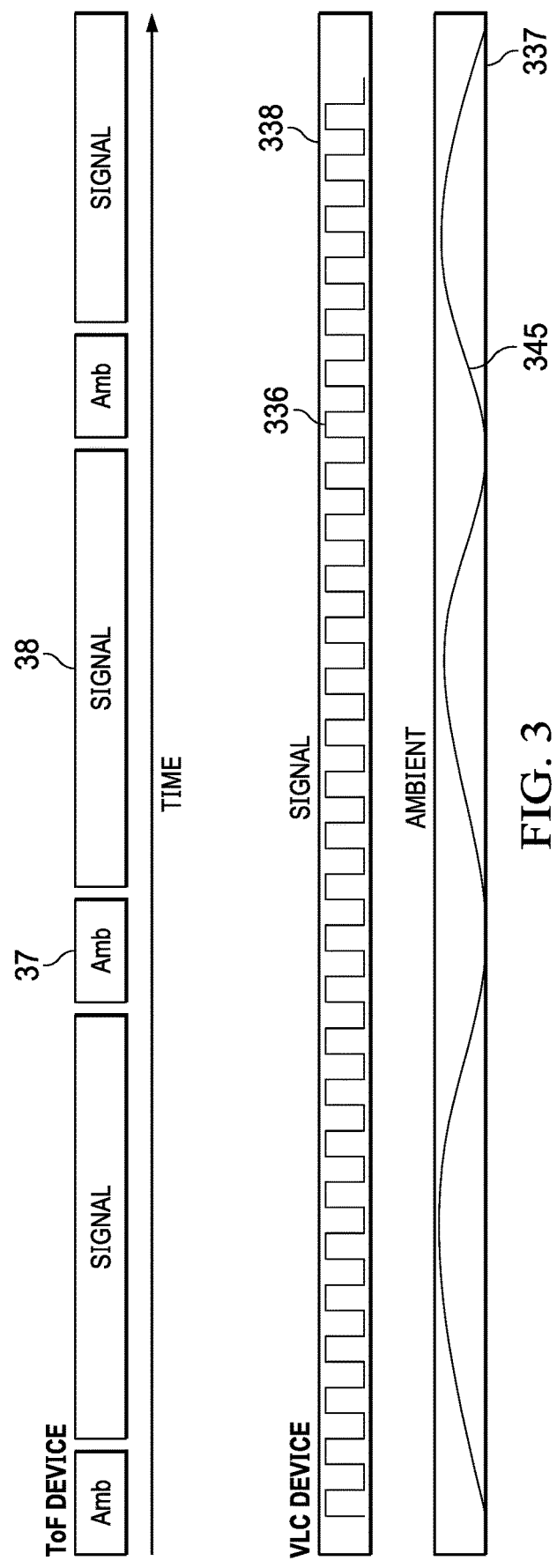
FIG. 3 illustrates a qualitative graph of data signal detection and ambient signal detection as a function of time for a time-of-flight device and an example visible light communication device in accordance with an embodiment of the invention.

FIG. 3 illustrates a qualitative graph of data signal detection and ambient signal detection as a function of time for a time-of-flight device and an example VLC device in accordance with an embodiment of the invention.

Referring to FIG. 3, a qualitative graph shows simultaneous and continuous ambient detection 337 of an ambient signal 345 and signal detection 338 of a data signal 336 corresponding to detection techniques of embodiment VLC device, VLC systems, and digital VLC receiver circuits as described herein. In contrast, a time-of-flight (ToF) device may utilize discontinuous ambient detection 37 in conjunction with discontinuous signal detection 38 as shown. The simultaneous and continuous ambient detection 337 of the ambient signal 345 and signal detection 338 of the data signal 336 may advantageously increase the efficiency of transmission, improve signal fidelity, and/or provide real-time background correction of VLC signals described herein.

Figure 4:
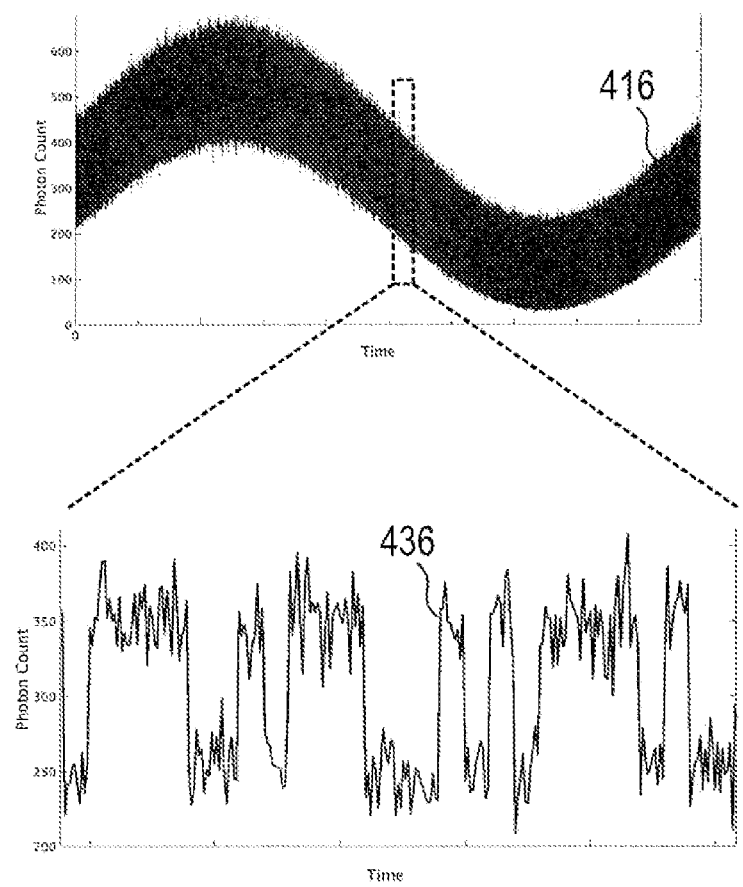
FIG. 4 illustrates example graphs of a photon count signal and a corresponding data signal generated by a digital visible light communication receiver circuit in accordance with an embodiment of the invention.

FIG. 4 illustrates example graphs of a photon count signal and a corresponding data signal generated by a digital VLC receiver circuit in accordance with an embodiment of the invention. The photon count signal and corresponding data signal of FIG. 4 may be specific examples of other photon count signals and data signals described herein, such as the photon count signal 216 and the data signal 236 of FIG. 2, for example.

Referring to FIG. 4, a graph of a photon count signal 416 is shown including a high frequency data component and a low frequency ambient component (a single period of the ambient signal is plotted). A graph of a corresponding data signal 436 with the ambient component removed and individual photon count values visible. As shown, the data signal 436 includes several (e.g. on the order of 10) photon count data points per bit. In this particular example, the shot noise is still apparent indicating a case in which a smoothing filter was not applied before removing the ambient component from the photon count signal 416.

Figure 5:
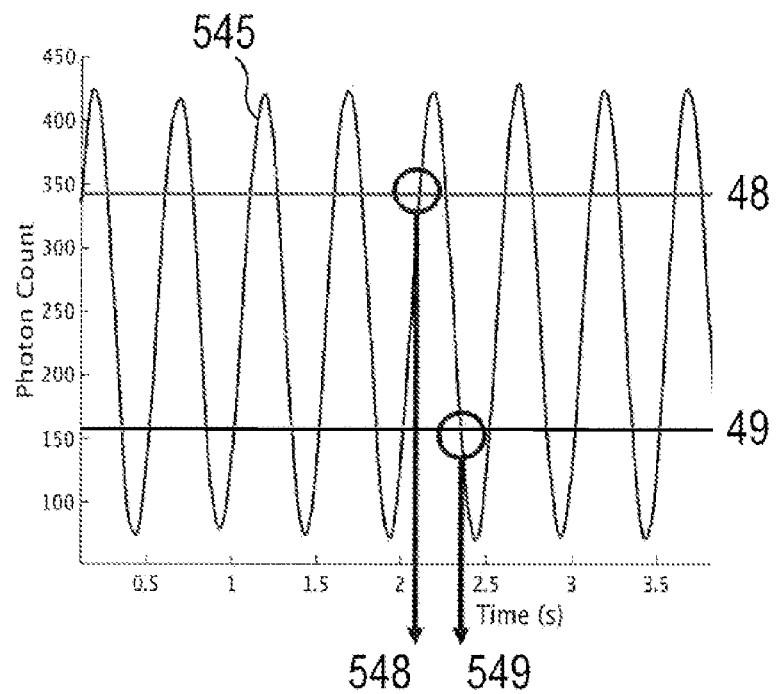
FIG. 5 illustrates a qualitative graph of an ambient signal that uses an upper threshold and a lower threshold to determine ambient frequency in accordance with an embodiment of the invention.

FIG. 5 illustrates a qualitative graph of an ambient signal that uses an upper threshold and a lower threshold to determine ambient frequency in accordance with an embodiment of the invention. The ambient signal of FIG. 5 may be a qualitative representation of other ambient signals described herein, such as the ambient signal 245 of FIG. 2, for example.

Referring to FIG. 5, a qualitative graph of an ambient signal 545 is shown with superimposed upper threshold 48 and lower threshold 49 to indicate a method of determining ambient frequency. The ambient signal 545 may be similar to the output of an IIR filter that has removed high frequency components from a photon count signal. However, actual ambient environments may have additional sources of variance that may give rise to false indications of changes in the ambient frequency. To counteract this effect, a hysteresis mechanism may be included that delays the determination that the ambient signal 545 has crossed from one extreme to another.

For example, as shown, a period of the ambient signal 545 may be recorded after the ambient signal 545 has crossed both the upper threshold 48 and the lower threshold 49 at a first crossing 548 and a second crossing 549. Such a delay in recording the period of the ambient signal 545 may advantageously reduce or eliminate incorrect calculations of the ambient frequency due to erroneous crossings of thresholds resulting in accurate detection of the ambient frequency. In this way, utilization of the upper threshold 48 and the lower threshold 49 may beneficially ignore small amounts of noise in the ambient signal 545.

Figure 6:
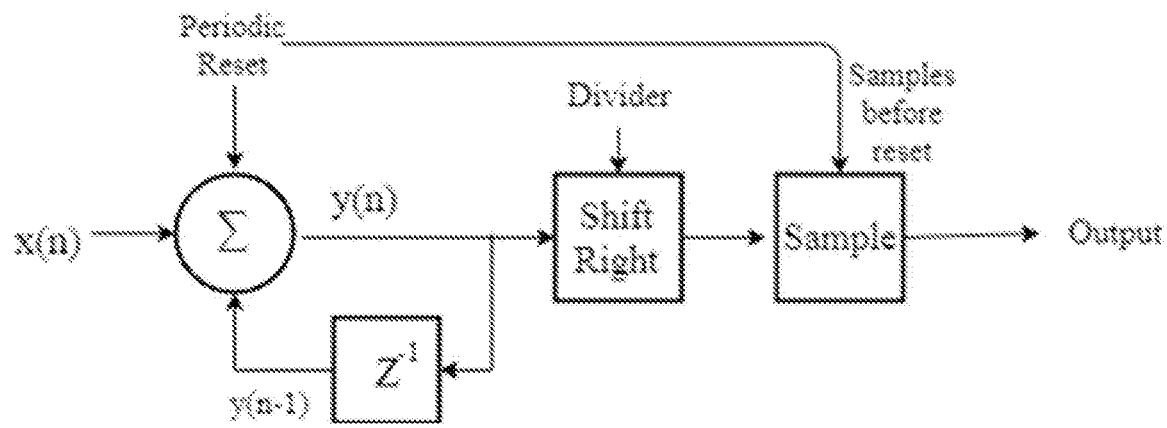
FIG. 6 illustrates an example infinite impulse response filter in accordance with an embodiment of the invention.

FIG. 6 illustrates an example IIR filter in accordance with an embodiment of the invention. The IIR filter of FIG. 6 may be a specific implementation of other IIR filters as described herein, such as the IIR filter 242 of FIG. 2, for example.

Referring to FIG. 6, an IIR filter 642 includes an adder which will continuously sum up the incoming photon count inputs. Within this implementation there is a new input arriving every clock cycle. The output sum from the adder is then divided. The divider value is the number of inputs included in the summation during one filter period. A filter period begins and ends when the periodic reset signal resets the adder to zero and instructs the sampler to pass the output from the divider operation to the output of the IIR filter. The size (i.e. number of inputs) of the filter period is set as a power of 2 so that the division can be replaced by the more efficient logical shift right operation. Hence, the filter produces an average value for all the inputs values that fall within one filter period. The average output from the filter is then the filter output for one whole filter period. After each periodic reset occurs the process repeats.

Figure 7A:
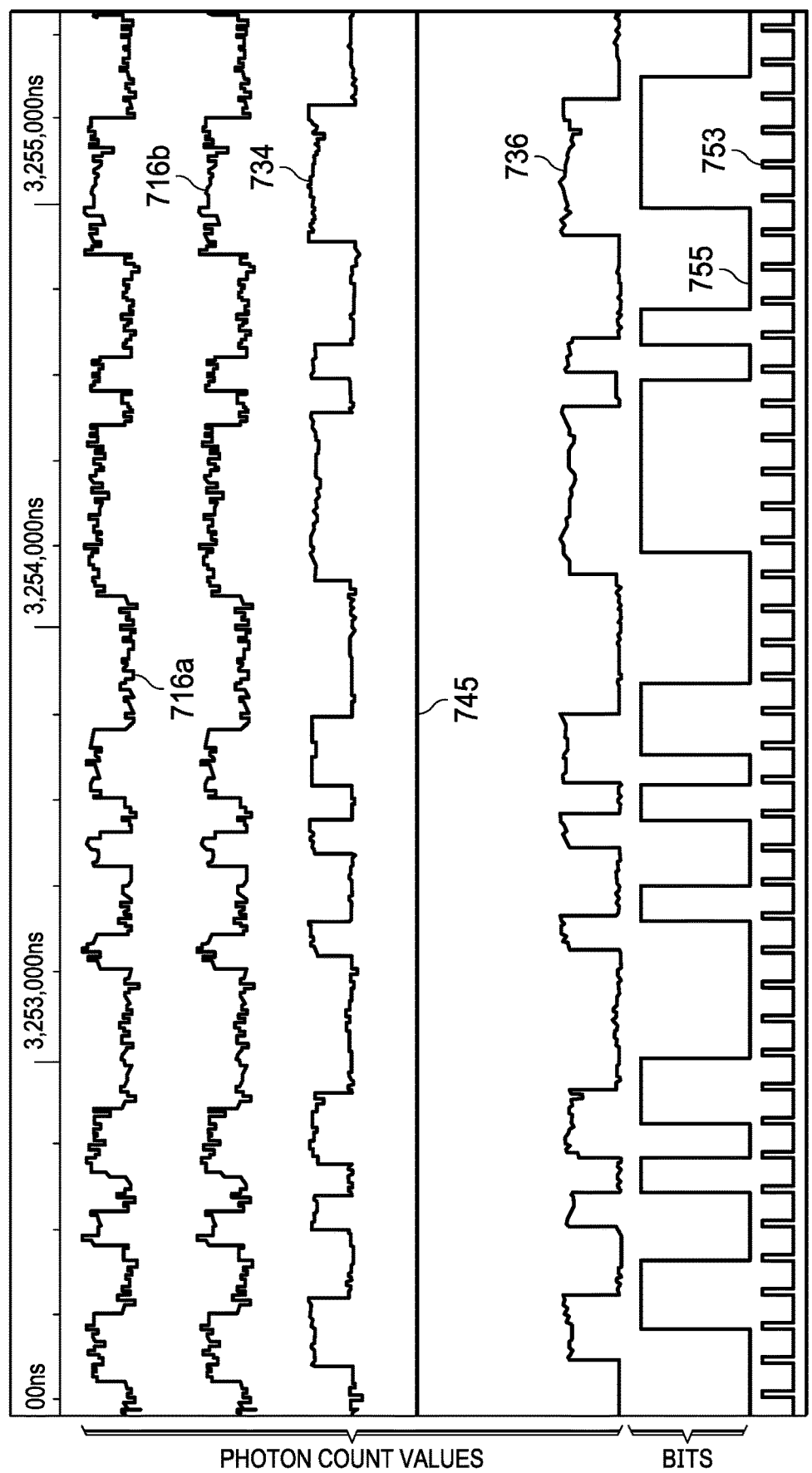
FIGS. 7A and 7B illustrate example graphs of various signals that may be generated by a visible light communication device in accordance with an embodiment of the invention, where the FIG. 7A illustrates a zoomed in portion of FIG. 7B.
Figure 7B:
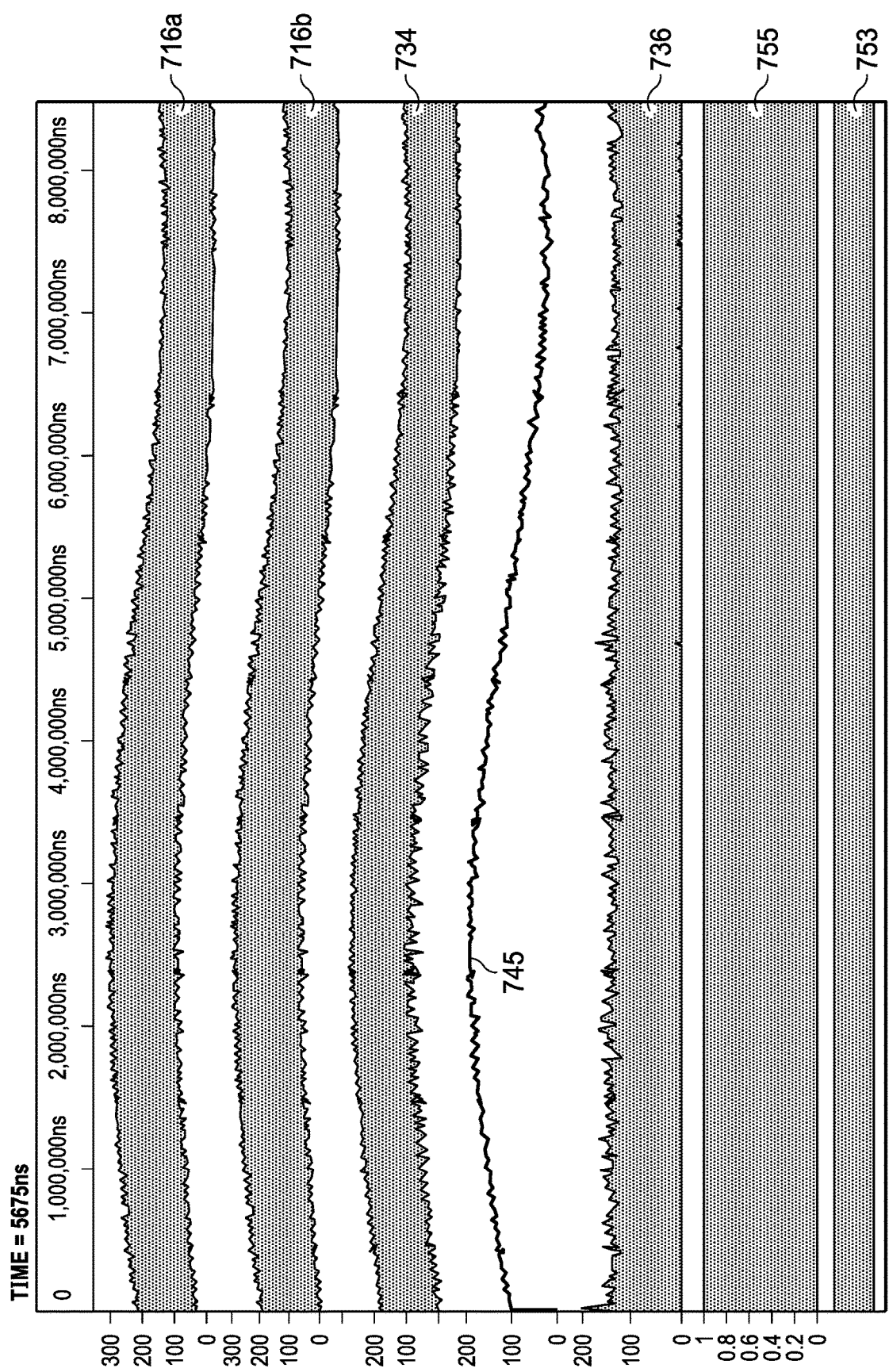

FIGS. 7A and 7B illustrates example graphs of various signals that may be generated by a VLC device in accordance with an embodiment of the invention, where the top graph is a zoomed in portion of the bottom graph. The signals shown in FIGS. 7A and 7B may be specific examples of signals generated by other VLC circuits as described herein, such as the digital VLC receiver circuit 202 of FIG. 2, for example.

Referring to FIGS. 7A and 7B, the graphs show various signals that may be generated by a VLC device. For example, two identical photon count signals 716a and 716b are shown which may be signals provided to a data extraction circuit and an ambient extraction circuit. The signals may be substantially similar or identical because they include both a data component and an ambient component each of which will be separated out by the appropriate circuit. Specifically, an ambient extraction circuit may isolate an ambient signal 745 from the photon count signal 716b as shown.

The photon count signal 716a may be smoothed to generate a smoothed signal 734. The ambient signal 745 may then be used to isolate a data signal 736 from the smoothed signal 734. The data signal may be demodulated to generate a demodulated data signal 755 using a data rate signal 753, for example. As shown, the data rate signal 753 may trigger a comparator to output a high or low logic signal one clock cycle after receiving the corresponding bit in the data signal 736 (e.g. the photon count value is sampled near the center of a pulse to avoid the edges).

Figure 8:
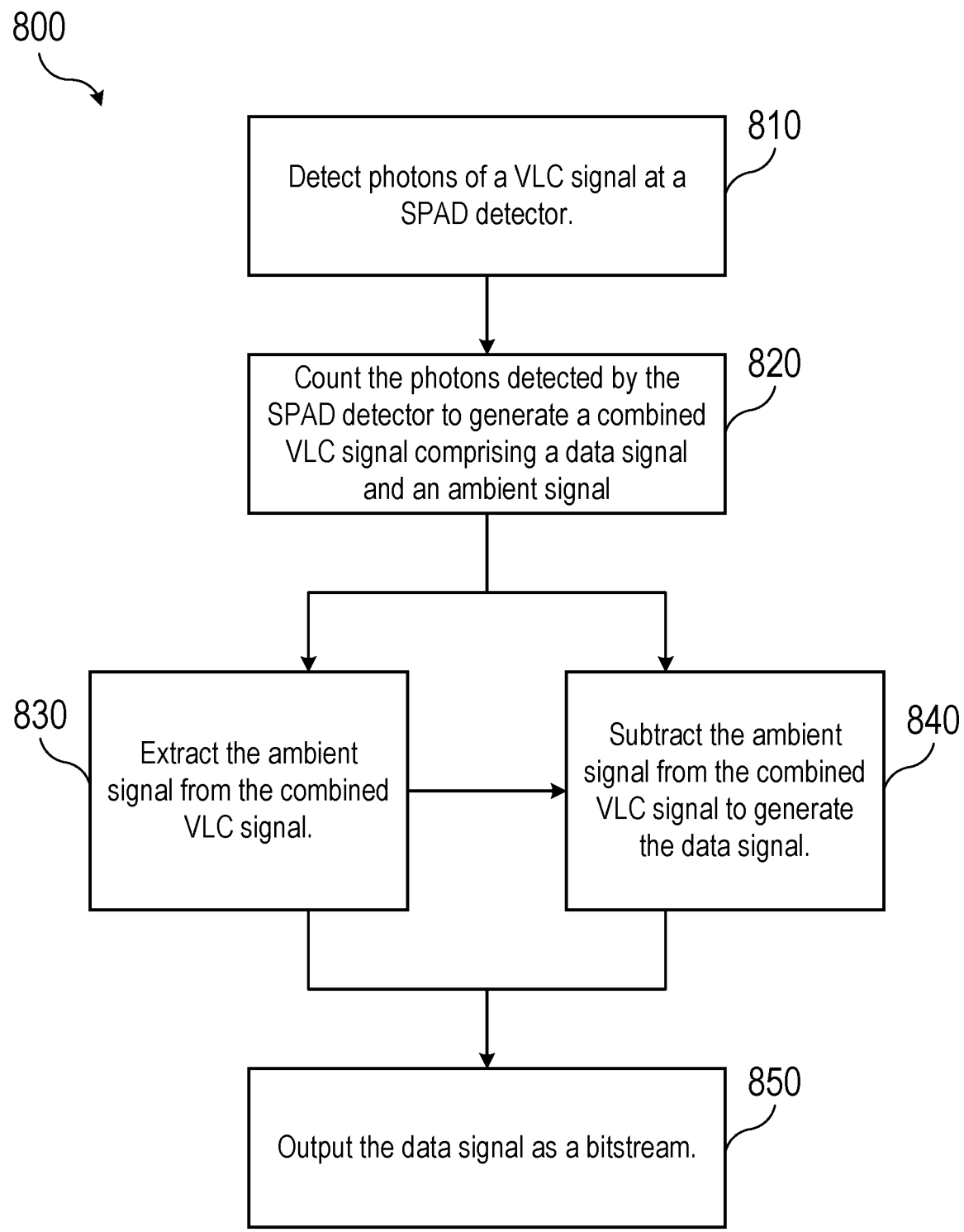
FIG. 8 illustrates an example method of processing a visible light communication signal using a single-photon avalanche diode in accordance with an embodiment of the invention.

FIG. 8 illustrates an example method of processing a VLC signal using a single-photon avalanche diode in accordance with an embodiment of the invention. The method of FIG. 8 may be performed by any of the embodiment VLC devices, VLC systems, and digital VLC receiver circuits as described herein.

Referring to FIG. 8, a method 800 includes a step 810 of detecting photons of a VLC signal at a SPAD detector. The method 800 further includes a step 820 of counting the photons detected by the SPAD detector to generate a combined VLC signal. The combine VLC signal includes a data signal and an ambient signal. Step 830 includes extracting the ambient signal from the combined VLC signal. Step 840 includes subtracting the ambient signal from the combined VLC signal to generate the data signal. In some embodiments, step 830 and step 840 are performed simultaneously. In some embodiments, step 830 and step 840 are performed continuously. For example, as long as a combined VLC signal is being generated by the SPAD detector, step 830 and step 840 may be simultaneously and continuously performed. The method 800 further includes a step 850 of outputting the data signal as a bitstream.

Example embodiments of the invention are summarized here. Other embodiments can also be understood from the entirety of the specification as well as the claims filed herein.

Example 1. A method of processing a visible light communication (VLC) signal using a single-photon avalanche diode (SPAD), the method including: detecting photons of a VLC signal at a SPAD detector; counting the photons detected by the SPAD detector to generate a combined VLC signal including a data signal and an ambient signal; extracting the ambient signal from the combined VLC signal; subtracting the ambient signal from the combined VLC signal to generate the data signal; and outputting the data signal as a bitstream.

Example 2. The method of example 1, where outputting the data signal includes: transcoding the data signal using an 8b/10b decoder to generate the bitstream; and outputting the bitstream.

Example 3. The method of one of examples 1 and 2, where the photons of the VLC signal include a wavelength in the near infrared (NIR) range of the electromagnetic spectrum.

Example 4. The method of one of examples 1 to 3, where outputting the data signal includes: tracking signal levels of the ambient signal, the data signal, and the combined VLC signal; and adjusting threshold settings according to the signal levels.

Example 5. The method of one of examples 1 to 4, where extracting the ambient signal includes: tracking the data signal to determine a data signal level; filtering the combined VLC signal using an infinite impulse response (IIR)

filter to generate a low frequency signal; and subtracting an amount equal to half the data signal level from the low frequency signal to generate the ambient signal.

Example 6. The method of one of examples 1 to 5, where outputting the data signal includes: determining a data rate from the data signal; demodulating the data signal to generate the bitstream using a comparator triggered by the data rate; and outputting the bitstream.

Example 7. The method of one of examples 1 to 6, further including determining a flicker rate from the ambient signal.

Example 8. The method of one of examples 1 to 7, where subtracting the ambient signal includes: smoothing the combined VLC signal using a bilateral filter to generate a smoothed signal; and subtracting the ambient signal from the smoothed signal to generate the data signal.

Example 9. The method of one of examples 1 to 8, where: detecting the photons includes detecting the photons of the VLC signal at a SPAD array including the SPAD; and counting the photons includes counting the photons detected by the SPAD array including the SPAD.

Example 10. A visible light communication (VLC) receiver including: a single-photon avalanche diode (SPAD) array configured to detect photons of a VLC signal; a plurality of photon counters electrically coupled to corresponding SPADs of the SPAD array and configured to count the photons detected by the SPAD array to generate a combined VLC signal including a data signal and an ambient signal; an ambient extraction circuit electrically coupled to the plurality of photon counters and configured to extract the ambient signal from the combined VLC signal; a data extraction circuit electrically coupled to the plurality of photon counters and the ambient extraction circuit, the data extraction circuit being configured to subtract the ambient signal from the combined VLC signal to generate the data signal; and an output circuit electrically coupled to the data extraction circuit and configured to output the data signal as a bitstream.

Example 11. The receiver of example 10, where the output circuit includes: an 8b/10b decoder configured to transcode the data signal to generate the bitstream.

Example 12. The receiver of example 11, where the output circuit further includes: a demultiplexer configured to select between sending the data signal to the 8b/10b decoder and bypassing the 8b/10b decoder.

Example 13. The receiver of one of examples 10 to 12, where the photons of the VLC signal include a wavelength in the near infrared (NIR) range of the electromagnetic spectrum.

Example 14. The receiver of one of examples 10 to 13, where the ambient extraction circuit includes: an infinite impulse response (IIR) filter electrically coupled to the plurality of photon counters.

Example 15. The receiver of one of examples 10 to 14, further including: a data rate detection circuit electrically coupled to the data extraction circuit and configured to determine a data rate of the data signal; and a comparator electrically coupled to both the data extraction circuit and the data rate detection circuit, the comparator being configured to demodulate the data signal using the data rate.

Example 16. A visible light communication (VLC) system including: a VLC transmitter including an encoder configured to encode a data signal to generate an encoded signal, and a photon emitter configured to transmit the encoded signal as a VLC signal; and a VLC receiver including a single-photon avalanche diode (SPAD) array configured to detect photons of the VLC signal and generate a photon count signal, a digital signal processing circuit electrically coupled to the SPAD array and configured to determine the encoded signal from the photon count signal, and a decoder electrically coupled to the digital signal processing circuit and configured to decode the encoded signal to generate the data signal.

Example 17. The system of example 16, where the photon emitter includes a vertical-cavity surface-emitting laser (VCSEL).

Example 18. The system of one of examples 16 and 17, where a data rate of the data signal is less than a data rate of the VLC signal.

Example 19. The system of example 18, where the data rate of the data signal is 75% of the data rate of the VLC signal.

Example 20. The system of one of examples 16 to 19, where the photons of the VLC signal include a wavelength in the near infrared (NIR) range of the electromagnetic spectrum.

Example 21. The system of one of examples 16 to 20, where the encoded signal is an 8b/10b encoded bitstream.

Example 22. The system of one of examples 16 to 21, where the digital signal processing circuit includes: an ambient extraction circuit electrically coupled to the SPAD array and configured to extract an ambient signal from the photon count signal; and a data extraction circuit electrically coupled to the SPAD array and the ambient extraction circuit, the data extraction circuit being configured to remove the ambient signal from the photon count signal.

Example 23. The system of one of examples 16 to 22, where the digital signal processing circuit includes: a data rate detection circuit electrically coupled to the SPAD array and configured to determine a data rate from the photon count signal; and a comparator electrically coupled to the SPAD array and the data rate detection circuit, the comparator being configured to demodulate the photon count signal according to the data rate.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of processing a visible light communication (VLC) signal using a single-photon avalanche diode (SPAD), the method comprising:
    detecting photons of a VLC signal at a SPAD detector;
    counting the photons detected by the SPAD detector to generate a combined VLC signal comprising a data signal and an ambient signal;
    extracting the ambient signal from the combined VLC signal;
    subtracting the ambient signal from the combined VLC signal to generate the data signal; and
    outputting the data signal as a bitstream by demodulating the data signal to generate the bitstream using a comparator triggered by a data rate.

2. The method of claim 1, wherein outputting the data signal comprises:
    transcoding the data signal using an 8b/10b decoder to generate the bitstream; and
    outputting the bitstream.

3. The method of claim 1, wherein the photons of the VLC signal comprise a wavelength in the near infrared (NIR) range of the electromagnetic spectrum.

4. The method of claim 1, wherein extracting the ambient signal comprises:
tracking the data signal to determine a data signal level;
filtering the combined VLC signal using an infinite impulse response (IIR) filter to generate a low frequency signal; and
subtracting an amount equal to half the data signal level from the low frequency signal to generate the ambient signal.

5. The method of claim 1, wherein outputting the data signal further comprises:
determining the data rate from the data signal; and
outputting the bitstream.

6. The method of claim 1, further comprising determining a flicker rate from the ambient signal.

7. The method of claim 1, wherein subtracting the ambient signal comprises:
smoothing the combined VLC signal using a bilateral filter to generate a smoothed signal; and
subtracting the ambient signal from the smoothed signal to generate the data signal.

8. The method of claim 1, wherein:
detecting the photons comprises detecting the photons of the VLC signal at a SPAD array comprising the SPAD; and
counting the photons comprises counting the photons detected by the SPAD array including the SPAD.

9. A visible light communication (VLC) receiver comprising:
a single-photon avalanche diode (SPAD) array configured to detect photons of a VLC signal;
a plurality of photon counters electrically coupled to corresponding SPADs of the SPAD array and configured to count the photons detected by the SPAD array to generate a combined VLC signal comprising a data signal and an ambient signal;
an ambient extraction circuit electrically coupled to the plurality of photon counters and configured to extract the ambient signal from the combined VLC signal;
a data extraction circuit electrically coupled to the plurality of photon counters and the ambient extraction circuit, the data extraction circuit being configured to subtract the ambient signal from the combined VLC signal to generate the data signal;
a comparator electrically coupled to the data extraction circuit and configured to demodulate the data signal using a data rate; and
an output circuit electrically coupled to the data extraction circuit and configured to output the data signal as a bitstream.

10. The receiver of claim 9, wherein the output circuit comprises:
an 8b/10b decoder configured to transcode the data signal to generate the bitstream.

11. The receiver of claim 9, wherein the photons of the VLC signal comprise a wavelength in the near infrared (NIR) range of the electromagnetic spectrum.

12. The receiver of claim 9, wherein the ambient extraction circuit comprises:
an infinite impulse response (IIR) filter electrically coupled to the plurality of photon counters.

13. The receiver of claim 9, further comprising:
a data rate detection circuit electrically coupled to the data extraction circuit and configured to determine the data rate of the data signal, the comparator being electrically coupled to the data rate detection circuit.

14. A visible light communication (VLC) system comprising:
a VLC transmitter comprising
an encoder configured to encode a data signal to generate an encoded signal, and
a photon emitter configured to transmit the encoded signal as a VLC signal; and
a VLC receiver comprising
a single-photon avalanche diode (SPAD) array configured to detect photons of the VLC signal and generate a photon count signal,
a digital signal processing circuit electrically coupled to the SPAD array and configured to determine the encoded signal from the photon count signal, the digital signal processing circuit comprising a comparator electrically coupled to the SPAD array and configured to demodulate the photon count signal according to a data rate of the VLC signal, and
a decoder electrically coupled to the digital signal processing circuit and configured to decode the encoded signal to generate the data signal.

15. The system of claim 14, wherein the photon emitter comprises a vertical-cavity surface-emitting laser (VCSEL).

16. The system of claim 14, wherein a data rate of the data signal is less than the data rate of the VLC signal.

17. The system of claim 14, wherein the photons of the VLC signal comprise a wavelength in the near infrared (NIR) range of the electromagnetic spectrum.

18. The system of claim 14, wherein the encoded signal is an 8b/10b encoded bitstream.

19. The system of claim 14, wherein the digital signal processing circuit comprises:
an ambient extraction circuit electrically coupled to the SPAD array and configured to extract an ambient signal from the photon count signal; and
a data extraction circuit electrically coupled to the SPAD array and the ambient extraction circuit, the data extraction circuit being configured to remove the ambient signal from the photon count signal.

20. The system of claim 14, wherein the digital signal processing circuit comprises:
a data rate detection circuit electrically coupled to the SPAD array and configured to determine the data rate of the VLC signal from the photon count signal, the comparator being electrically coupled to the SPAD array and the data rate detection circuit.

* * * * *

UNITED STATES PATENT AND TRADEMARK OFFICE
CERTIFICATE OF CORRECTION

PATENT NO. : 10,992,384 B1
APPLICATION NO. : 16/730036
DATED : April 27, 2021
INVENTOR(S) : Ellen Couper Page 1 of 1

It is certified that error appears in the above-identified patent and that said Letters Patent is hereby corrected as shown below:

In the Claims

Column 16, Lines 54-55, Claim 20, delete "the SPAD array and".

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*